April 12, 1927.
C. F. COWDREY
1,624,219
BRAKE TESTING INSTRUMENT
Filed Feb. 20, 1925
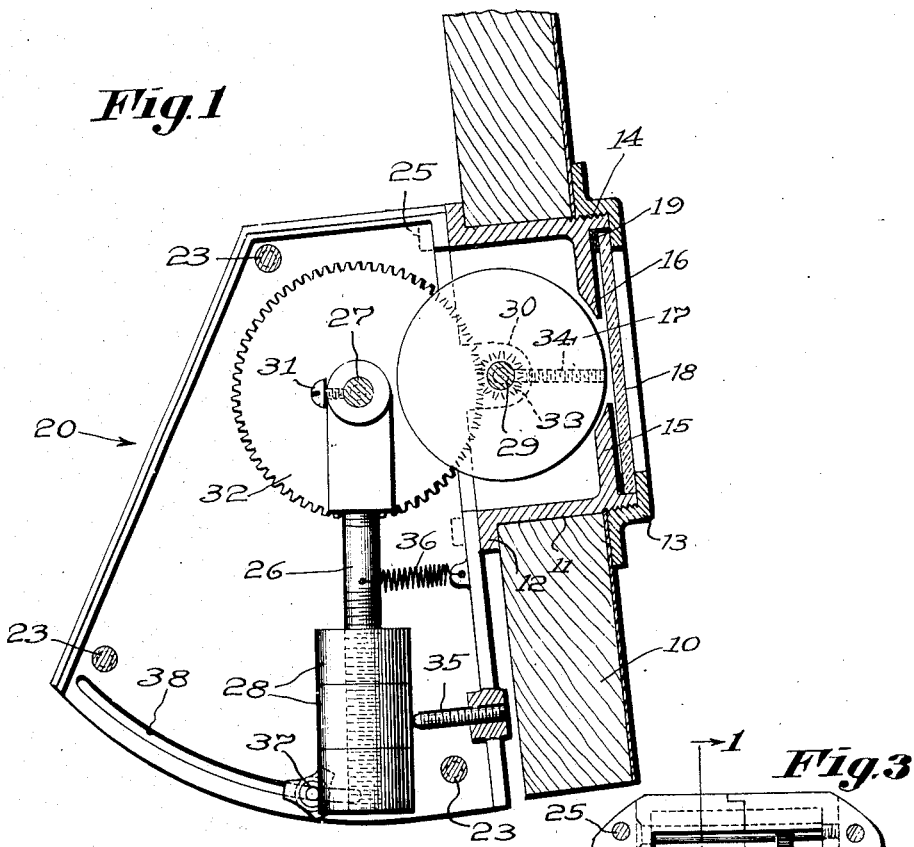
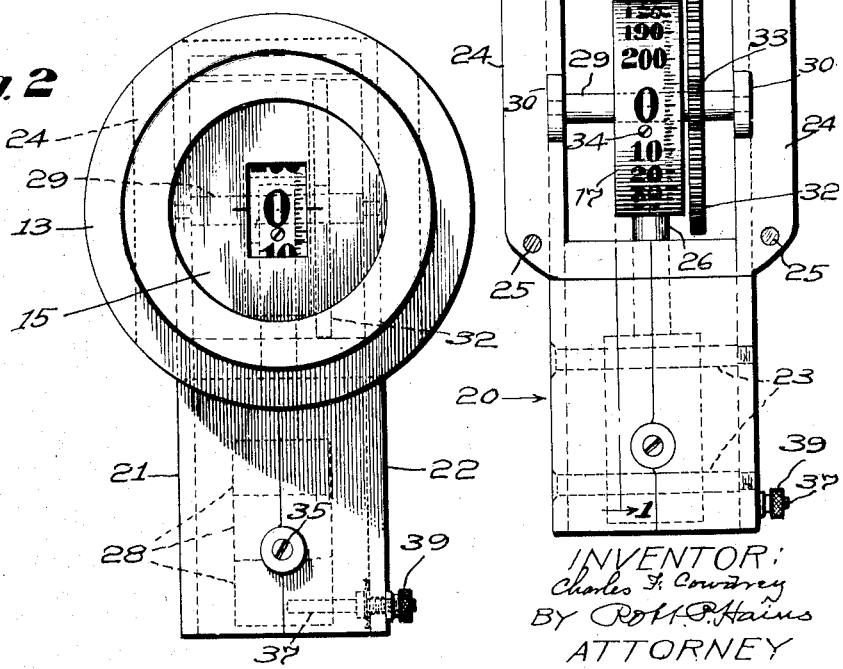
INVENTOR:
Charles F. Cowdrey
BY Rob't P. Hains
ATTORNEY Patented Apr. 12, 1927.

1,624,219

UNITED STATES PATENT OFFICE.

CHARLES F. COWDREY, OF FITCHBURG, MASSACHUSETTS, ASSIGNOR TO MUTHER MANUFACTURING COMPANY, OF BOSTON, MASSACHUSETTS, A CORPORATION OF MASSACHUSETTS.

BRAKE-TESTING INSTRUMENT.

Application filed February 20, 1925. Serial No. 10,522.

This invention relates to an instrument for indicating the speed checking or retarding effect of the brakes upon an automobile, and more particularly to an indicating device that is constructed to be mounted upon the instrument board of an automobile where it may be readily observed.

It is of primary importance that the brakes of an automobile be maintained in good condition and properly adjusted so that they may always be relied upon promptly to check the speed of an automobile in any emergency. Since the brake bands of an automobile wear out more or less rapidly and the brakes may require frequent adjustment or renewal of parts, it is highly desirable that automobiles be provided with simple means for indicating when the brakes are operating properly.

To this end, the present invention is directed to a simple device which may be permanently mounted upon the instrument board of an automobile to indicate how promptly the speed of the automobile may be checked by applying the brakes. With such a device constantly before the driver of an automobile, he may readily observe how efficiently the brakes are working whenever they are applied, and will know when the brakes need attention.

The various features of the invention and novel combination of parts will be best understood from the following description, when read in connection with the accompanying drawings illustrating one good practical form of the invention.

In the drawings:—

Fig. 1 is a vertical sectional view through the brake testing device of the present invention mounted on the instrument board of an automobile, the section being taken on line 1—1 of Fig. 3.

Fig. 2 is a front face view of the device of Fig. 1; and

Fig. 3 is a front view of the pendulum enclosing casing, the casing that is mounted in the instrument board being removed.

In the drawing, 10 is the usual instrument board of an automobile which is provided with the brake testing instrument of the present invention. This instrument may be variously constructed and is shown as having a cylindrical or cup-shaped casing 11 mounted in a hole in the instrument board 10. The casing 11 has a rear flange 12 that rests against the rear face of the board 10 and the casing 11 may be firmly secured to the instrument board by tightening up the flange nut 13 having threaded engagement with the threaded end 14 of the casing. The casing 11 has a front wall 15 in which is formed an opening 16 through which may be read the graduation upon the cylindrical face of the indicator 17. The front face or wall 15 is preferably protected by the glass plate 18 confined between a soft washer 19 and the inwardly extending flange of the nut 13.

At the rear of the instrument board 10 is mounted the pendulum enclosing casing 20 formed of the similar sections 21 and 22 secured together by transversely extending bolts 23. The casing 20 is secured to and is supported by the cylinder casing 11, and to this end, the casing 20 has laterally extending flanges 24 that are fastened to the casing 11 by screws 25.

Within the casing 20 is mounted the pendulum 26 supported by the transversely extending shaft 27, and the opposite ends of this shaft are journaled in holes formed in the walls of the sections 21 and 22. The pendulum 26 preferably has a threaded stem upon which are adjustably mounted two or more weights 28 threaded upon the stem. The number of the weights may be increased or decreased to vary the weight of the pendulum, and they may be secured in any desired position lengthwise of the stem by rotating the weights upon the stem and then clamping one against the other.

The indicator 17 is mounted upon a transversely extending shaft 29 the ends of which are journaled in ears 30 extending laterally from the sections 21 and 22. Means is provided for causing movement of the pendulum 26 to rotate the indicator 17, and to this end the pendulum is rigidly secured to the shaft 27 by a set-screw 31. A gear 32 rigidly secured to the shaft 27 meshes with a pinion 33 rigidly secured to the shaft 29, and the indicator is secured to the shaft 29 in the desired position of angular adjustment by the set-screw 34. The arrangement is such that rocking movement of the pendulum 26 rotates the shaft 27 to impart an increased movement to the shaft 29 through the cooperating gear and pinion.

When the brake testing instrument of the present invention is mounted upon the instrument board of an automobile, as described, the pendulum 26 will hang in a vertical position during the normal operation of the automobile, but when the speed of the automobile is checked by the application of the brakes, the pendulum will swing in a clockwise direction, viewing Fig. 1, under the action of its momentum, and the amount of movement imparted to the pendulum may be noted by observing the graduations of the indicator 17 which appear through the opening 16. If the brakes are properly adjusted to stop the automobile promptly the sudden checking of the speed of the automobile will cause the pendulum 26 to swing through a substantial arc, while if the brakes do not promptly check the speed of the automobile, the pendulum will swing through a much smaller arc.

The instrument board 10 is mounted at a greater inclination to the vertical in some automobiles than others, and the pendulum may therefore assume different vertical positions when installed in different automobiles. This changing of the vertical position of the pendulum would change the zero position of the indicator 17. The indicator 17 is therefore provided with the set screw 34 which serves to secure the indicator in any desired position of angular adjustment upon the shaft 29.

It is desirable to provide a stop to limit the movement of the pendulum in a right-hand direction and this may take the form of an adjustable screw 35 that may be adjusted to stop the pendulum in a vertical position irrespective of the angle at which the instrument board 10 may slope. In some cases it may be desirable to provide a weak spring 36 having one end secured to the pendulum and the other to the casing 20. This spring serves to prevent the pendulum from partaking of minor vibrations of the automobile and serves also to restrict its moving under application of the brakes.

It may be desirable to provide means for holding the pendulum firmly against the stop 35 when the same is not being used, and to this end a sliding pin 37 is provided extending inwardly through a slot 35 of a side wall. This pin may be manually adjusted by grasping the nut 39 upon its outer end, and a friction washer upon the pin may serve to hold the pin in its adjusted position. When a reading is to be taken the pin 37 is moved away from the pendulum to the rear end of the slot 38.

What is claimed is:—

1. An instrument for indicating the speed retarding effect of the brakes of an automobile, comprising in combination, a casing constructed to be mounted at the rear face of an automobile instrument board and having a laterally extending portion adapted to enter an opening in the instrument board, a pendulum supported in the casing by a horizontally extending shaft and arranged to swing from its vertical position under the action of momentum when the brakes of the automobile are applied, an indicator disk rotatably mounted within said laterally extending portion in front of said shaft and in position to be observed from the front of the instrument board and having its edge graduated to indicate brake retardation, a driving connection between the disk and pendulum, a stop against which the pendulum normally rests and adapted to be adjusted to accommodate the inclination of different instrument boards, and means for adjusting the operating connection between the pendulum and indicator to conform to the inclination of the instrument board upon which the indicating instrument is mounted.

2. An instrument for indicating the speed retarding effect of the brakes of an automobile, comprising in combination, a casing constructed to be mounted at the rear face of an automobile instrument board and having a laterally extending portion adapted to enter an opening in the instrument board, a pendulum supported in the casing by a horizontally extending shaft and arranged to swing from its vertical position under the action of momentum when the brakes of the automobile are applied, an indicator disk rotatably mounted within said laterally extending portion in front of said shaft and in position to be observed from the front of the instrument board and having its edge graduated to indicate brake retardation, a driving connection between the disk and pendulum, a stop against which the pendulum rests when in its vertical position, and a spring for holding the pendulum against said stop with just enough force to prevent the pendulum from swinging under the effect of minor vibrations.

3. An instrument for indicating the speed retarding effect of the brakes of an automobile, comprising in combination, a casing constructed to be mounted at the rear face of an automobile instrument board and having a laterally extending portion adapted to enter an opening supported in the casing to swing in a vertical plane and adapted to swing from its vertical position under the action of momentum when the brakes of the automobile are applied, an indicator disk rotatably mounted within the casing and in position to be observed from the front of the instrument board and having its edge graduated to indicate brake retardations, a driving connection between the disk and pendulum, a stop against which the pendulum normally rests, and manually operable means extending across the path of the pendulum and movable against the pendulum to hold it inoperative.

4. An instrument for indicating the speed retarding effect of the brakes of an automobile, comprising in combination, a casing having a part constructed to be mounted in an opening formed in an automobile instrument board and having a front face in which a sight opening is formed, an indicator disk mounted within said casing to rotate in a vertical plane adjacent said sight opening and having graduations upon its edge that are displayed through said sight openings to indicate brake retardations, a pendulum for actuating the indicator disk, a stop for holding the pendulum in its normal inactive position, and manually operable means extending across the path of the pendulum and movable into engagement with the pendulum to hold it inoperative.

In testimony whereof, I have signed my name to this specification.

CHARLES F. COWDREY.